United States Patent Office 3,584,006
Patented June 8, 1971

3,584,006
5-AMINO-THIAZOLIDINE-4-CARBOXYLIC ACID COMPOUNDS
Robert Burns Woodward, 12 Oxford St., Cambridge, Mass. 02138
No Drawing. Original application Aug. 22, 1966, Ser. No. 573,865, now Patent No. 3,481,948. Divided and this application Dec. 16, 1968, Ser. No. 784,255
Claims priority, application Switzerland, Sept. 10, 1965, 12,623; Dec. 9, 1965, 16,972, 16,974; Feb. 3, 1966, 1,530
Int. Cl. C07d 91/18
U.S. Cl. 260—306.7                  5 Claims

ABSTRACT OF THE DISCLOSURE

Process for the manufacture of a member selected from the group consisting of 2,2-disubstituted 3-acyl-5α-amino-thiazolidine-4-carboxylic acids and derivatives thereof, wherein in a member selected from the group consisting of 2,2 - disubstituted 3 - acyl - 5α - azido-thiazolidine-4-carboxylic acid and a derivative thereof the azido group is converted into an amino group. Also included are products produced by the process of the invention, useful in the synthesis of cephalosporanic acids.

CROSS-REFFERENCES TO RELATED APPLICATIONS

This application is a division of application Ser. No. 573,865, filed Aug. 22, 1966, and now U.S. Pat. No. 3,481,948.

The present invention relates to a methodological process for the manufacture of azido compounds and the corresponding amino derivatives, which process is used in the manufacture of valuable intermediate products and which, in particular, was used in the first synthesis of 7-amino-cephalosporanic acid and the derivatives thereof, the process being specially suitable for this synthesis.

7-amino-cephalosporanic acid has the following Formula XVI

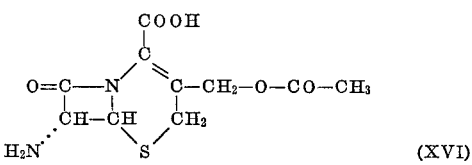

(XVI)

The derivatives are mainly N-acyl compounds in which the acyl radicals are especially those of active N-acyl derivatives of 7-amino-cephalosporanic acid, for example, thienylacetyl, e.g. 2-thienylacetyl, cyanoacetyl, chloroethylcarbamyl or phenylacetyl radicals or easily eliminable acyl radicals such as the radical of a semi-ester of carbonic acid, for example, the tertiary-butyloxycarbonyl radical.

The synthesis of this important compound, which is of great value in the preparation of medicaments, and the derivatives thereof is based on the principle of using a 3,5-unsubstituted 2,2-disubstituted thiazolidine-4-carboxylic acid as starting material, for example, a compound of the Formula I

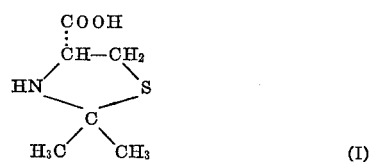

(I)

and carrying out the novel synthesis, for example, according to the following scheme of formulae:

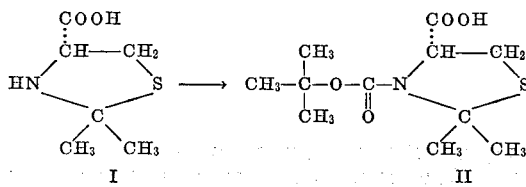

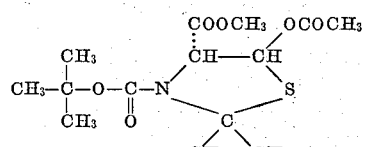

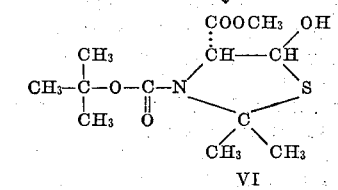

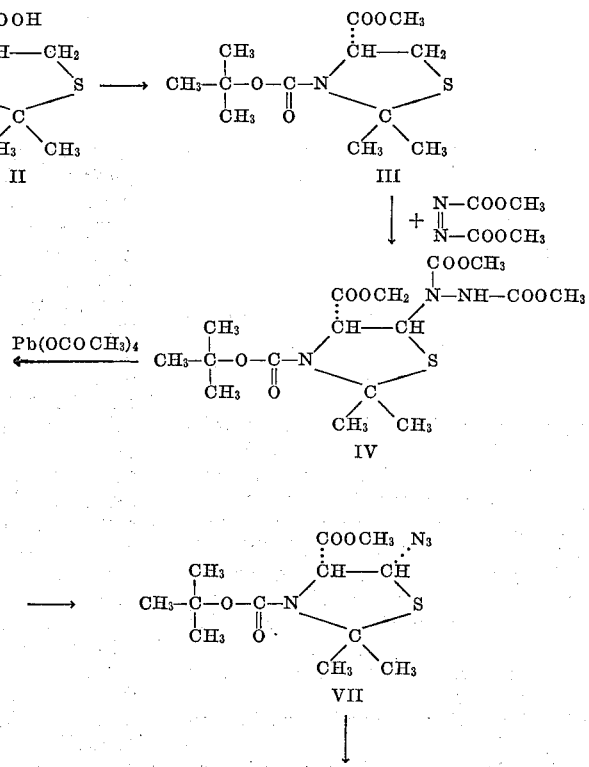

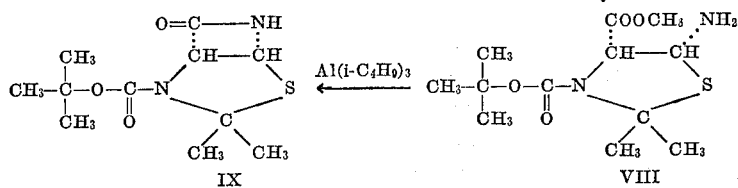

The compound IX is converted into the desired 7-amino-cephalosporanic acid and its derivatives as follows:

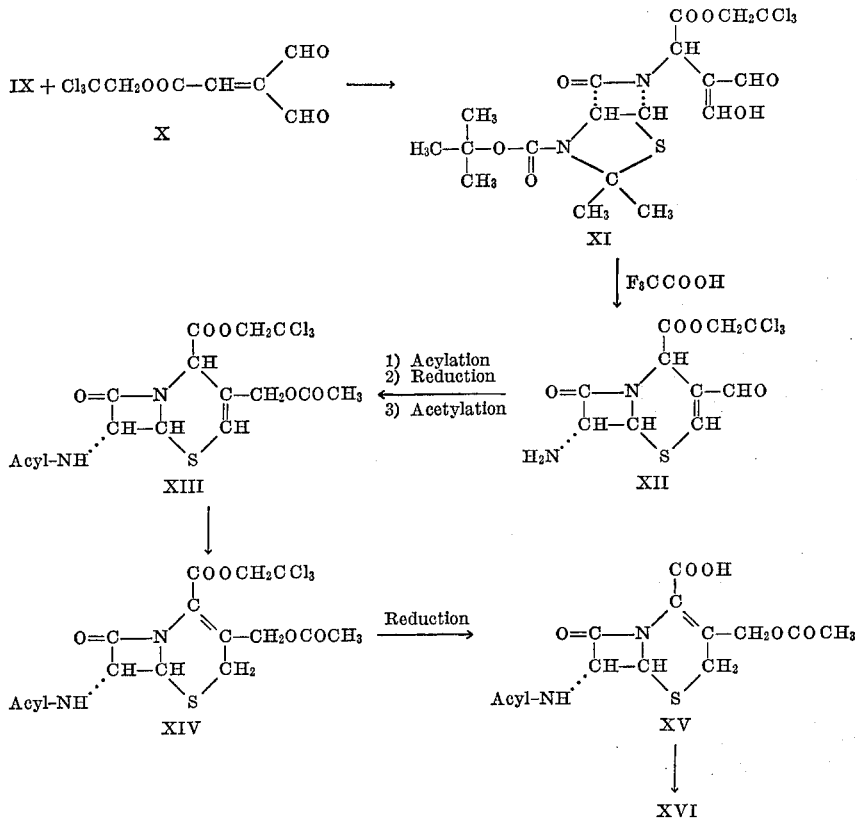

The compound of the Formula X used as an intermediate product is prepared as follows:

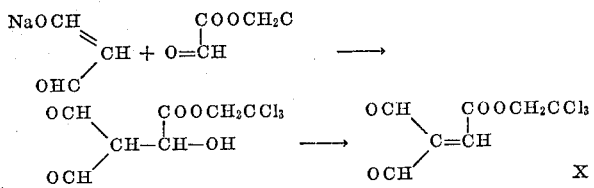

The above-mentioned valuable products are, surprisingly, obtained by reacting a 2,2-disubstituted 3-acyl-thiazolidine-4-carboxylic acid containing a reactive esterified hydroxyl group in 5β-position, or a derivative thereof, with a salt of hydrazoic acid and, if desired, converting in a resulting 2,2-disubstituted 3-acyl-5α-azido-thiazolidine-4-carboxylic acid or a functional derivative thereof, such as in a compound of the Formula VII, the azido group into an amino group, and/or, if desired, converting a substituent in a resulting compound into another substituent and/or, if desired, separating a mixture of isomers obtained into the single isomers.

A reactive esterified hydroxyl group is a hydroxyl group esterified with an inorganic acid, especially a strong mineral acid, for example, a hydrohalic acid, such as hydrochloric, hydrobromic or hydriodic acid, or sulfuric acid, or with a strong organic acid, for example, a strong organic carboxylic acid, such as 4-nitrobenzoic acid, or a strong organic sulfonic acid, such as methanesulfonic acid, p-toluenesulfonic acid, p-bromobenzenesulfonic acid or p- or m-nitrobenzenesulfonic acid.

The reaction between the starting material and the salts of hydrazoic acid, for example, a metal azide, such as an alkali metal azide, for example, sodium azide or lithium azide, is advantageously carried out in the presence of a suitable diluent, especially a polar, anhydrous or water-containing solvent, for example, dimethyl formamide or diethyl formamide, N-methylpyrrolidone, acetonitrile or phosphoric acid tri-di-methylamide, as well as dimethyl sulfoxide, dimethyl acetamide or a lower alkanol, for example, methanol, ethanol, isopropanol or tertiary-butanol. Other salts of hydrazoic acid are, for example, ammonium azides, particularly organic ammonium azides, such as a tetra-aliphatic ammonium azide, for example, a tetraalkylammonium azide, such as tetraethyl ammonium azide, cetyl-trimethylammonium azide or cetyl-triethylammonium azide, or a trialkyl-phenyl-lower alkyl-ammonium azide, such as benzyl-trimethyl- or benzyl-triethylammonium azide; these azide compounds are advantageously used in the presence of solvents, such as those mentioned above, for example, methylene chloride, acetonitril, benzene, dioxane, tetrahydrofuran, dimethyl sulfoxide, dimethyl formamide, phosphoric acid tri-di-methylamide or mixtures thereof. If necessary, the reaction is performed with cooling or heating and/or in an inert gas atmosphere.

Conversion of the azido group into the amino group can be effected by reduction, for example, with the aid of catalytically activated hydrogen, e.g. in the presence of a catalyst containing a metal belonging to Group VIII of the Periodic Table, for example, palladium, under atmospheric pressure or superatmospheric pressure, or with a chemical reducing agent, such as nascent hydrogen, generated, for example, by reacting metals, metal alloys or amalgams with substances yielding hydrogen, such as zinc, zinc alloys, for example, zinc-copper, or zinc amalgam in the presence of acids, for example, organic carboxylic acids, such as acetic acid, or alcohols, such as methanol, alkali metal amalgams, such as sodium or potassium amalgam, or aluminum amalgam in the presence of moist or hydrogen-yielding substances, for example, moist ether or lower alkanols, such as methanol. Further suitable reagents are, for example, metal hydrides, such as alkali metal aluminum hydrides, for example, lithium aluminum hydride, alkali metal trialkoxy-aluminum hydrides, for example, lithium-tri-tertiary-butyloxy aluminum hydride, or organo-tin hydrides, for example, diisobutyl-tin hydride. Other agents are reducing metal salts, e.g. chromium-(II)-compounds, for example, chromium-(II) acetate or chromium-(II) chloride, and particularly metal stannties, for example, alkali metal, such as sodium stannites ($Na_2SnO_2$), as well as metal arsenites or thioarsenites, for example alkali metal arsenites or thioarsenites, such as sodium arsenite ($Na_3AsO_3$) or sodium thioarsenite ($Na_3AsS_3$), these reagents being preferably used while cooling and in aqueous media containing, for example, water-miscible organic solvents, such as methanol or ethanol, or sulfides with reducing properties, such as alkali metal sulfides, for example, sodium sulfide, or ammonium sulfides, such as those soluble in organic solvents, for example, ammonium sulfide or tetraethylammonium sulfide.

The azido group in the starting material can also be converted into an amino group by first converting it into a phosphine-imino group, for example, by treatment with a suitable phosphine, such as a trialkyl phosphine, for example, tri-n-butylphosphine, as well as a triaryl phosphine, for example, triphenyl phosphine, and then hydrolysing, for example, by treatment with water.

The above reaction is carried out in the presence or absence of diluents, especially those, if desirable, that are inert towards the reactants and/or are capable of dissolving the said reactants, and/or substances having a catalytic action, with cooling, at room temperature or while heating, if necessary, in a closed vessel under superatmospheric pressure and/or in the atmosphere of an inert gas.

Substituents in the compounds obtained can be converted in known manner into other substituents. Acid derivatives that are obtained, for example, esters, can be converted into the free acids without removal of the acyl group in 3-position, especially an easily eliminable acyl group, for example, a tertiary-butyloxycarbonyl group. Thus, a carbo-diphenylmethoxy group may be converted into a free carboxyl group under acidic conditions, for example, in the presence of catalytic amount of an acid, such as trifluoroacetic acid. Furthermore, it has also been observed, that a carboxy group esterified with a 2,2,2-trihalogeno-ethanol, especially 2,2,2-trichloroethanol, can then be converted into a free carboxyl group by means of reducing agents. Suitable reducing agents are chemical reducing agents, for example, nascent hydrogen, obtained, for example, by reacting metal, metal alloys or amalgams with hydrogen-yielding substances, such as, zinc, zinc alloys, for example, zinc copper, or zinc amalgam in the presence of acids, for example, organic carboxylic acids, such as acetic acid or alcohols, such as lower alkanols, alkali metal amalgams, for example, sodium or potassium amalgam, or aluminum amalgam, in the presence of moist ether or lower alkanols; furthermore, alkali metals, for example, lithium, sodium or potassium or alkaline earth metals, for example, calcium, in liquid ammonia, if necessary, with the addition of alcohols, for example, a lower alkanol. A carboxy group esterified with a 2,2,2-trihalogenoethanol, such as 2,2,2-trichloroethanol may also be liberated by treatment with strongly-reducing metal salts, such as chromium-II-compounds, for example, chromium-II-acetate or chromium-II-chloride, preferably in the presence of aqueous media containing water-miscible solvents, such as lower alkanols, lower alkane carboxylic acids or ethers, for example, methanol, ethanol, acetic acid, tetrahydrofuran, dioxane ethyleneglycol dimethylether or diethyleneglycol dimethlyether. In this process the reductive splitting of a 2,2,2-trihalogenated ethyl ester can take place at the same time as the reductive conversion of the azido group into the desired amino group.

Free carboxyl groups in resulting compounds can be converted by methods in themselves known into their functional derivatives, for example, their esters, amides, hydrazides or azides, Thus, they can be esterified, for example, by treatment with a diazo compound, for example, a diazo-lowalkane, for example, diazomethane or diazoethane, or with a phenyl-diazoalkane, such as phenyldiazomethane or diphenyldiazomethane, or by reaction with a hydroxyl compound suitable for esterification, for example, an alcohol, a phenol compound, or an N-hydroxy-nitrogen compound, such as a hydroxamic acid, in the presence of an esterification agent, for example a carbodiimide, such as dicyclohexylcarbodiimide, or carbonyldiimidazole, or by any other known and suitable esterification process, for example, reaction with a reactive ester of the hydroxy compound, especially an alcohol, and a strong inorganic acid or a strong organic sulfonic acid, if desired, in the presence of a salt-forming base.

A functionally converted carboxy group in a resulting compound can also be converted by methods in themselves known into another functionally modified carboxy group, e.g. esterified group, for example, by transesterification, such as treatment with a hydroxy compound in the presence of a trans-esterification catalyst. Furthermore, esters and especially activated esters, for example, esters with N-hydroxy-nitrogen compounds, or anhydrides, for example, with chloroformic acid esters, such as methyl esters thereof, can be converted into other esters, as well as into amides or hydrazides by reaction with other hydroxy compounds, for example, alcohols, or phenol compounds, and with ammonia, with at most secondary amines or hydrazines, respectively. A nitrogen atom containing a hydrogen in a resulting amide or hydrazide compound can subsequently be substituted, for example, by treatment with a derivative of a carboxylic or sulfonic acid, for example, an acid halide, and/or with a reactive esterified alcohol or by means of other suitable reagents; an N-unsubstituted amide can be converted into a nitrile, for example, by dehydration.

If necessary, the free amino group can be temporarily protected, for example, by suitable acylation, during these additional process steps.

Mixtures of isomers obtained can be resolved into the single isomers by known methods, for example, by fractional crystallization or distillation, by adsorption chromatography (column or thin-layer chromatography) or by other processes. Resulting racemates can be resolved into the free compounds or into the antipodes by forming a mixture of diastereoisomeric salts with optionally active salt-forming agents, separating the mixture into the diastereoisomeric salts and converting the separated salts.

The invention further includes any variant of the present process in which an intermediate product obtainable at any stage of the process is used as starting material and any remaining steps are carried out, or the process is discontinued at any stage thereof; furthermore, the starting materials may be used in the form of derivatives, for example, their salts, or they may be formed during the reaction.

It is advantageous to select starting materials and reaction conditions that produce the compounds indicated above as being specially preferred.

The compounds obtainable by the process of the invention are 2,2-disubstituted 3-acyl-5α-azido-thiazolidine-4-carboxylic acids and the functional derivatives thereof, especially the compounds of the formula

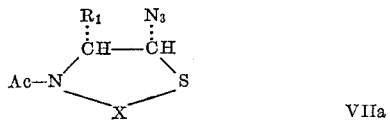

VIIa and the 2,2-disubstituted 3-acyl-5α-amino-thiazolidine-4-carboxylic acids and especially the functional derivatives thereof, for example, the compounds of the Formula VIIIa

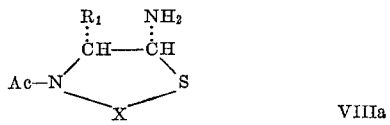

VIIIa in which Ac stands for an acyl group, especially one of the above-mentioned acyl groups, X represents the disubstituted carbon atom of the thiazolidine ring and $R_1$ represents a free or functionally modified carboxyl group.

The acyl radicals Ac are primarily those that are present in pharmacologically active N-acyl derivatives of 7-aminocephalosporanic acid, such as thienylacetyl, for example, 2-thienylacetyl, chloroethylcarbamyl or phenylacetyl radicals, or easily eliminable acyl radicals, for example, the radical of a semi-ester of carbonic acid, for example, a tertiary butyloxycarbonyl radical, or any other suitable acyl radicals of organic acids.

The radical —X— represents, in particular, a group of the formula

in which $R_2$ and $R_3$ represent hydrocarbon radicals, especially aliphatic hydrocarbon radicals, for example, lower alkyl groups, for example, ethyl, n-propyl, isopropyl or preferably methyl groups, as well as aromatic groups, especially phenyl groups, or araliphatic hydrocarbon radicals, especially phenylalkyl groups, for example, benzyl or phenylethyl groups, as well as functionally converted, particularly esterified carboxy groups, such as carbo-lower alkoxy, for example, carbomethoxy or carbethoxy groups, or, together, represent a divalent hydocarbon radical, especially a divalent aliphatic hydocarbon radical, for example, a lower alkylene group, for example, a 1,4-butylene or 1,5-pentylene group, as well as a phthaloyl group, or represent an oxo group or a thiono group. The above-mentioned hydrocarbon radicals are unsubstituted or may be substituted, for example, by lower alkyl groups, such as methyl or ethyl groups, lower alkoxy groups, such as methoxy or ethoxy groups, halogen atoms, such as fluorine, chlorine or bromine atoms, halogenated alkyl groups, for example, trifluoromethyl groups or other suitable groups.

The group $R_1$ represents a free or preferably functionally modified carboxyl group, especially an esterified carboxyl group. The latter is esterified with any kind of hydroxy compound suitable for esterifying carboxylic acids, especially aliphatic alcohols, for example, alkanols, especially lower alkanols, such as methanol, ethanol, n-propanol or tertiary butanol, cycloaliphatic alcohols, for example, cycloalkanols, such as cyclohexanol, or araliphatic alcohols, for example, phenyl alkanols, such as benzyl alcohol or diphenylmethanol, as well as phenol compounds, whereby the above-mentioned hydroxy compounds may be unsubstituted or may be substituted by lower alkyl, lower alkoxy or trifluoromethyl groups or especially halogen atoms and other groups; substituted hydroxy compounds particularly suitable for esterifying the carboxylic acid are halogenated lower alkanols, for example, 2,2,2-trichloroethanol.

Other functionally converted carboxyl groups $R_1$ are, for example, nitrogen-containing functionally modified carboxyl groups, for example, carbamyl groups which are unsubstituted or which may be mono-substituted or di-substituted at the nitrogen atom by aliphatic, alicyclic, aromatic or araliphatic hydrocarbon radicals or heterocyclic radicals having aromatic characteristics, for example, lower alkyl, cyclolkyl, phenyl, phenyl-lower alkyl, phenyl-lower alkylidene or pyridyl radicals, which may optionally be substituted by lower alkyl groups, free, esterified or etherified hydroxyl groups, for example, lower alkoxy, aralkoxy, lower alkanoyloxy or aroyloxy groups or halogen atoms, nitro or trifluoromethyl groups, as well as by free, etherified or esterified hydroxyl groups, for example, the above-mentioned groups of this type, by radicals containing phosphorus or by acyl radicals, for example, radicals of carboxylic acids, such as radicals of semi-esters or semi-amides of carbonic acid, or lower alkanoyl radicals, or of sulfonic acids, such as arylsulfonic acids, for example, phenylsulfonyl radicals, as well as nitrile groups, azidocarbonyl groups or hydrazinocarbonyl as well as azocarbonyl groups that may be monosubstituted or polysubstituted at the nitrogen atom, for example, by the above-mentioned substituents of the carbamyl group.

The starting materials used in the above process are new and are included in this invention. The said starting materials are, in particular, the compounds of the formula

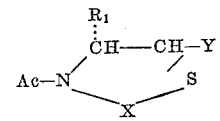

in which Ac, $R_1$ and X have the meanings given above and Y represents a reactive esterified hydroxyl group. The latter is one of the above-mentioned esterified hydroxyl groups, especially a hydroxyl group esterified with one of the above-mentioned strong organic carboxylic or sulfonic acids or with a hydrohalic acid.

The compounds used as starting materials are obtainable, for example, by treating a derivative of a 2,2-disubstituted 3-acyl-5β-hydroxy-thiazolidine-4-carboxylic acid with an acid or a functional derivative of an acid, and, if desired, separating a resulting mixture of isomers into the single isomers.

Functional acid derivatives are primarily acid halides, such as chlorides or bromides, for example, inorganic acid halides, such as thionyl chloride or phosphorus trichloride, or organic acid halides, for example, oxalyl chloride or phosgene; further acid derivatives are, for example, anhydrides, including inner anhydrides, i.e. ketenes. Esterification of the intermediate product can also be effected with free acids, especially organic acids in the presence of esterification reagents.

The reaction is carried out in the presence or absence of a diluent, which is preferably inert towards the reactants and/or is capable of dissolving them, in the presence or absence of condensing agents and/or catalysts, if necessary, with cooling or heating, in a closed vessel and/or in an inert atmosphere. The condensing agents used are, for example, those which are capable of neutralizing generated acid, for example, pyridine, it being possible to use liquid bases as additional solvents. Further condensing agents which are suitable for use in the preparation of reactive esters are, for example, carbodiimides, such as dicyclohexylcarbodiimide.

The 2,2-disubstituted 3-acyl-5β-hydroxy-thiazolidine-4-carboxylic acids and the derivatives thereof used as intermediate products are prepared by the processes described in application Ser. No. 573,890, filed Aug. 22, 1966 (now U.S. Pat. No. 3,483,216); and application Ser. No. 573,891, filed Aug. 22, 1966.

Starting materials may also be obtained directly from the 5-unsubstituted 2,2-disubstituted 3-acyl-thiazolidine-4-carboxylic acid derivatives, such as a compound of the Formula III, for example, by treatment with a suitable halogenating reagent, such as bromotrichloromethane in the presence of ditertiary butyl peroxalate, or gaseous chlorine.

2,2-disubstituted 3-acyl-4-thiazoline-4-carboxylic acids or the derivatives thereof may be formed during the preparation of the starting materials; these by-products are formed by dehydration. Dehydration can also occur, for example, by treating a 2,2-disubstituted 3-acyl-5β-hydroxy-thiazolidine-4-carboxylic acid or a functional derivative thereof with a suitable adsorbent, for example, silica gel. These by-products are, in particular, compounds of the formula

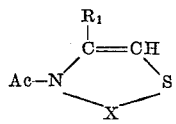

in which Ac, R₁ and X have the meanings given above; they are likewise new and are included in the present invention. These unsaturated compounds can also be used as intermediate products; for example, they can be converted into 2,2-disubstituted 3-acyl-5-hydroxy- or -5-esterified hydroxy-thiazolidine-4-carboxylic acids or derivatives thereof, or example, into the compounds of the Formula V or Formula VI, by the direct or indirect addition of water or of a suitable acid, for example, a carboxylic acid or a hydrohalic acid.

In addition to dehydration, the above-mentioned 2,2-disubstituted 3-acyl-4-thiazoline-4-carboxylic acids or especially the functional derivatives thereof can also be obtained by acylating 2,2-disubstituted 3-thiazoline-4-carboxylic acids or the functional derivatives thereof. Acylation is preferably carried out with a functional derivative of an organic carboxylic acid in one or more steps; suitable functional derivatives are acyl halides, for example, chlorides, or acyl anhydrides, as well as ketenes. Acylation is carried out in the presence or absence of a solvent, preferably in the presence of a base, for example, triethylamine or pyridine, if necessary, with cooling or heating.

Substituents of the resulting unsaturated by-products obtained can be converted into other substituents by known methods, as described above.

As is shown in the above reaction scheme, the compounds resulting from the process of the invention can be converted into 7-amino-cephalosporanic acid and the derivatives thereof; conversion can be effected for example, by the processes described in application Ser. No. 573,815, filed Aug. 22, 1966 (now U.S. Pat. No. 3,483,215); application Ser. No. 573,886, filed Aug. 22, 1966 (now U.S. Pat. No. 3,468,933); application Ser. No. 573,866, filed Aug. 22, 1966 (now U.S. Pat. No. 3,449,336); and application Ser. No. 573,876, filed Aug. 22, 1966 (now U.S. Pat. No. 3,449,336).

The following examples illustrate the invention.

EXAMPLE 1

A solution of 66 g. of L-2,2-dimethyl-3-tertiary butyloxycarbonyl - 5β - hydroxy - thiazolidine-4-carboxylic acid methyl ester in 900 ml. of anhydrous dimethylformamide is treated with 141.5 ml. of ethyl-diisopropylamine, followed by 51.7 ml. of methane sulfonyl chloride, the latter being added dropwise at 15 to 18° C. while stirring vigorously; the addition is complete after 25 minutes. The reaction mixture containing the L-2,2-dimethyl-3-tertiary-butyloxycarbonyl - 5β-methylsulfonyl-oxy-thiazolidine-4-carboxylic acid methyl ester of the formula

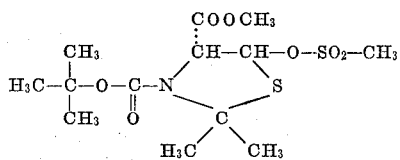

is stirred for one hour at room temperature, and then a solution of 73.7 g. of sodium azide in 181 ml. of water is added dropwise while stirring vigorously. The addition, which is made at 20° C., is completed after 45 minutes, and the reaction mixture is poured into 6000 ml. of ether. The organic solution is extracted twice with 100 ml. of a 20% aqueous citric acid solution each time, and washed once with 500 ml. of a cold saturated sodium hydrogen carbonate solution and 6 times with 2000 ml. of cold water each time. After drying and evaporating under a water-jet vacuum at room temperature, a brown crude product is obtained which is immediately chromatographed on 40 times the amount by weight of silica gel containing 5% of water. The column is prepared in pure benzene; a yellow oil is eluted with a 9:1 mixture of benzene and ethyl acetate, which is dissolved in pentane and filtered through a column containing 54 g. of a charcoal preparation; the colorless viscous material obtained after evaporating the pentane crystallizes from the same volume of pentane, with refrigeration, and yields the L-2,2-dimethyl - 3 - tertiary-butyloxycarbonyl-5α-azido-thiazolidine-4-carboxylic acid methyl ester of the formula

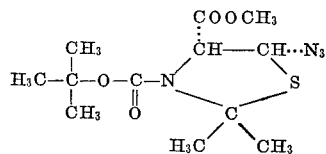

the analytical preparation of which melts at 55 to 56° C.; $[\alpha]_D = -525° \pm 1°$ (c.=1.007 in chloroform); infra-red absorption bands (in methylene chloride) at 4.75μ, 5.70μ, 5.90μ, 7.35μ, 7.45μ, 8.40μ, 8.65μ and 9.35μ; ultra-violet absorption bands (in 95% ethanol) $\lambda_{max}$ 208mμ (ε=3620).

The mother liquor contains a further amount of the desired product, as well as a small amount of the corresponding 5β-azido compound and of the 2,2-dimethyl-3-tertiary - butyloxycarbonyl-4-thiazoline-4-carboxylic acid methyl ester of the formula

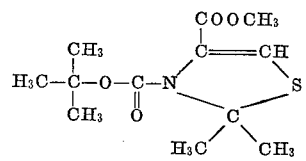

boiling at 65° C./0.001 mm. Hg; M.P. 34 to 36.5° C.; infra-red absorption bands (in methylene chloride) at 5.88μ, 6.37μ, 7.34μ, 7.45μ, 7.62μ, 8.24μ, 8.65μ, 8.85μ, 9.32μ, 9.82μ and 11.91μ; ultra-violet absorption bands (in ethanol) $\lambda_{max}$ 270 mμ (ε=5320) and 316 mμ (ε=5960), a greater amount of unreacted starting material being isolated from the chromatogram by washing out with a 1:1 mixture of ethyl acetate and benzene.

EXAMPLE 2

A solution of 33 grams of L-2,2-dimethyl-3-tertiary butyloxycarbonyl - 5β - hydroxy-thiazolidine-4-carboxylic acid methyl ester in 250 ml. of anhydrous dimethylformamide is treated with 48 ml. of triethylamine, the batch is cooled to 15° C. and then 26 ml. of methane sulfonyl chloride are added dropwise in the course of 25 minutes with stirring and with the exclusion of moisture, the temperature being kept at 15 to 20° C. by cooling. After stirring for 90 minutes at room temperature, 36.9 g. of sodium azide in 90 ml. of water are allowed to run into the reaction mixture containing the L-2,2-dimethyl-3-tertiary butyloxycarbonyl - 5β - methylsulfonyloxy - thiazolidine-4-carboxylic acid methyl ester, while stirring vigorously; the batch is stirred for a further 45 minutes at 20° C. and it is then poured onto a mixture of 250 ml. of a saturated sodium chloride solution and 5 grams of citric acid. The mixture is extracted three times with 250 ml. of cyclohexane each time, the organic extracts obtained are washed with 150 ml. of water, combined, dried, and evaporated under a water-jet vacuum. The crude product obtained after degassing is dissolved in 600 ml. of pentane, stirred for 15 minutes with 16 g. of a charcoal preparation, filtered, and the active carbon is washed twice with 300 ml. of pentane each time. The colorless product obtained is crystallized from pentane and the desired pure L - 2,2-dimethyl-3-tertiary-butyloxycarbonyl-5α-azido-thiazolidine-4-carboxylic acid methyl ester melting at 55 to 56° C. is obtained. The mother liquor contains a further amount of the desired products, as well as a small amount of 2,2-dimethyl-3-tertiary butyloxycarbonyl-4-thiazoline-4-carboxylic acid methyl ester.

EXAMPLE 3

L - 2,2 - dimethyl-3-tertiary-butyloxycarbonyl-5α-azido-thiazolidine-4-carboxylic acid methyl ester is obtained in the manner described in Example 1 by treating L-2,2-dimethyl - 3 - tertiary - butyloxycarbonyl-5-(4-nitrobenzoyloxy)-thiazolidine-4-carboxylic acid methyl ester with sodium azide.

The starting material used above is prepared as follows: 0.536 g. of 4-nitrobenzoyl chloride and 0.25 ml. of pyridine are added to a solution of 0.291 g. of L-2,2-dimethyl-3-tertiary butyloxycarbonyl-5β-hydroxy-thiazolidine-4-carboxylic acid methyl ester in 15 ml. of methylene chloride; the reaction mixture is boiled for 64 hours under reflux and then diluted with 200 ml. of methylene chloride. After extraction with 20 ml. of 10% aqueous citric acid and two portions of 50 ml. each of an aqueous 1 N sodium hydrogen carbonate solution, the oragnic phase is washed with 50 ml. of water, dried over magnesium sulfate and evaporated. The semi-crystalline product so obtained is crystallized from hexane; from the liquid phase there is obtained L - 2,2 - dimethyl-3-tertiary-butyloxy-carbonyl 5β-(4-nitrobenzoyloxy)-thiazolidine-4-carboxylic acid methyl ester of the formula

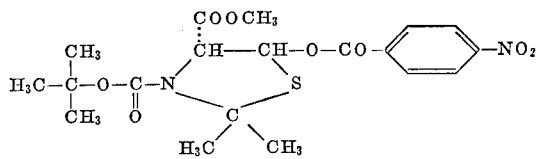

$[\alpha]_D = +109° \pm 0.3°$ (c.=2.89 in chloroform); infra-red absorption bands (in methylene chloride) at 5.72μ, 5.83μ, 5.92μ, 6.27μ, 6.57μ, 7.25μ, 7.45μ, 8.6μ, 9.2μ, 9.88μ, 10.55μ, 11.48μ and 11.90μ; ultra-violet absorption bands (in ethanol) $\lambda_{max}$ 259 mμ (ε=21500).

EXAMPLE 4

A total of 0.5 g. of pulverized sodium azide is added to 0.525 g. of crude L-2,2-dimethyl-3-tertiary butyloxycarbonyl-5β-chloro-thiazolidine-4-carboxylic acid methyl ester in 5 ml. of absolute dimethylformamide and the mixture is stirred for 30 minutes; 100 ml. of water and 100 ml. of ether are then added. The aqueous phase is washed with ether and the combined organic extracts are washed with water, dried, and evaporated. The residue is dissolved in 10 ml. of methylene chloride, treated with 1 g. of a diatomaceous earth preparation (Florisil) and filtered. The residue is crystallized from pentane at −15° C. and L-2,2-dimethyl - 3-tertiary-butyloxy-carbonyl-5α-azido-thiazolidine-4-carboxylic acid ester melting at 52 to 54° C. is obtained.

The starting material used in the above example is prepared as follows: 0.4 ml. of triethylamine is added to a solution of 0.5 gram of L-2,2-dimethyl-3-tertiary-butyloxycarbonyl-5β-hydroxy-thiazolidine-4-carboxylic acid methyl ester in 20 ml. of methylene chloride and then a stream of dry phosgene is passed through the mixture for 2 minutes. During this process the temperature of the solution rises to the boil and triethylammonium chloride precipitates. After evaporation the residue is dissolved in 50 ml. of ether, the insoluble salt is filtered off and the filtrate is evaporated to yield the colorless L-2,2-dimethyl-3-tertiary-butyloxycarbonyl-5β-chloro-thiazolidine-4-carboxylic acid methyl ester of the formula

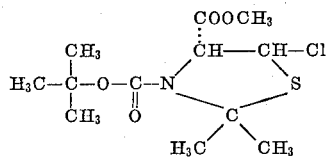

whose infra-red absorption spectrum (in methylene chloride) shows bands at 5.70μ, 5.90μ, 7.26μ, 7.40μ, 8.35μ, 8.63μ, 9.35μ, 10,10μ and 11.67μ. The product is worked up without further purification.

EXAMPLE 5

The L - 2,2 - dimethyl - 3 - tertiary-butyloxycarbonyl-4-cyano-5α-azido-thiazolidine of the formula

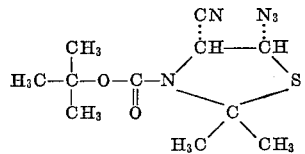

is obtained by treating L-2,2-dimethyl-3-tertiary-butyloxycarbonyl-4-cyano - 5β - chloro - thiazolidine with sodium azide by the process described in Example 1.

The starting material used in the above procedure is obtained as follows: 0.2 ml. of triethylamine is added to a solution of 0.07 g. of L-2,2-dimethyl-3-tertiary butyloxycarbonyl-5β-hydroxy-thiazolidine-4-carboxylic acid amide in 5 ml. of methylene chloride, a stream of phosgene is passed through the mixture for 2 minutes and the mixture is then evaporated to dryness. The residue is extracted with 20 ml. of hot ether, the ether solution is filtered and the residue is purified by chromatography on silica gel. The L-2,2-dimethyl-3-tertiary - butyloxycarbonyl-4-cyano-5β-chloro-thiazolidine of the formula

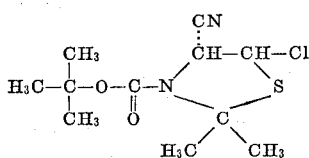

is eluted with a 9:1 mixture of benzene and ethyl acetate; the product sublimes at 80° C./0.0005 mm. Hg and its infra-red spectrum (in methylene chloride) shows bands at 4.53μ, 5.90μ, 7.26μ, 7.36μ, 7.50μ, 8.70μ, 9.38μ, 11.78μ and 11.90μ.

EXAMPLE 6

A solution of 0.358 g. of L-2,2-dimethyl-3-tertiary-butyloxycarbonyl-5β-hydroxy-thiazolidine - 4 - carboxylic acid methyl ester in 20 ml. of methylene chloride is treated with 1.5 ml. of freshly distilled di-isopropylethylamine (large excess) and 0.1 ml. of methane sulfonyl chloride and the reaction mixture is allowed to stand in a closed vessel. After 72 hours, the main product is still starting material; 0.1 ml. of additional methane sulfonyl chloride is added and the mixture is boiled under reflux for 23 hours. The residue obtained by evaporation under mild conditions is dissolved in 250 ml. of methylene chloride, extracted twice with ice-cold citric acid of 10% strength and washed once with water. After drying over anhydrous magnesium sulfate and evaporation, a brown, viscous oil is obtained which is chromatographed on 23 grams of silica gel containing 5% of water. 2,2-dimethyl-3-tertiary butyloxycarbonyl-4-thiazoline-4-carboxylic acid methyl ester is obtained in the form of a viscous oil with a 98:2 mixture of benzene and ethyl acetate.

The 2,2-dimethyl-3-tertiary-butyloxycarbonyl-4-thiazoline-4-carboxylic acid methyl ester is also obtained as the main product in the esterification of L-2,2-dimethyl-3-tertiary-butyloxycarbonyl-5β-hydroxy - thiazolidine-4-carboxylic acid methyl ester with methane sulfonyl chloride in the presence of a 1:1-mixture of pyridine and methylene chloride or a 1:4-mixture of collidine and methylene chloride as solvent, the reaction mixture being worked up in the absence of water.

EXAMPLE 7

A mixture of 10.4 grams of 2,2-dimethyl-3-thiazoline-4-carboxylic acid methyl ester (M.P. 70–71° C.) and 17 ml. of acetic anhydride in 12.5 ml. of triethylamine and 175 ml. of toluene is boiled under reflux for 40 hours at a bath temperature of 120° C. The brown reaction mixture is evaporated and the last traces of the reagents are removed by diluting twice with 50 ml. of xylene each time and then with 50 ml. of toluene and evaporating the solvent each time. The residue is distilled in a high vacuum and chromatographed on silica gel; the desired 2,2-dimethyl-3-acetyl-4-thiazoline-4-carboxylic acid methyl ester of the formula

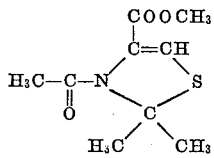

is eluted with a 4:1 mixture of benzene and ethyl acetate and again distilled; B.P. 80–90° C./0.01 mm. Hg; M.P. 31.5–34° C.; infra-red absorption bands (in methylene chloride) at 5.83μ, 6.00μ, 6.40μ, 7.35μ, 8.20μ, 9.80μ and 11.8μ; ultra-violet absorption bands (in ethanol) $\lambda_{max}$ 222 mμ ($\epsilon$=6100), 275 mμ ($\epsilon$=4200) and 321 mμ ($\epsilon$=7850).

The starting material used in the above example is obtained as follows: 27 g. of di-isopropylethylamine are added to a solution of 26.34 g. of the ammonium salt of 2,2-dimethyl-3-thiazoline-4-carboxylic acid in 800 ml. of methanol, the reaction mixture is stirred for 15 minutes and then evaporated under reduced pressure. The residue is dissolved in 60 ml. of toluene, the solution is evaporated and the residue is dissolved in 600 ml. of ethyl acetate, and then 19.1 grams of dimethylsulfate are added. After stirring for 21 hours, the reaction mixture is cooled in an ice bath, 150 ml. of ice-cold saturated solution of sodium hydrogen carbonate in water are added, the mixture is stirred for 15 minutes, 600 ml. of benzene and a small amount of water are added, and the mixture is shaken for 2 minutes, the resulting emulsion formed being clarified by the addition of 60 ml. of a saturated aqueous sodium chloride solution. The organic phase is washed twice with 60 ml. of a saturated sodium chloride solution; the combined aqueous solutions are extracted with 300 ml. of ethyl acetate and the combined organic solutions are washed three times with 90 ml. of a 10% aqueous citric acid solution each time, and once with 90 ml. of water and then evaporated. The reddish brown residue crystallizes spontaneously and is extracted three times with 150 to 200 ml. of boiling pentane each time, while stirring; the orange-colored extracts are allowed to stand overnight, filtered through a layer of magnesium sulfate, the filtrate is concentrated to a volume of 250 ml. and allowed to stand for 12 hours at 4° C. This process yields the 2,2-dimethyl-3-thiazoline-4-carboxylic acid methyl ester which melts at 70.5 to 71.5° C. after recrystallization from pentane; infra-red absorption (in methylene chloride): 5.8μ, 7.55μ, 8.15μ, 9.28μ and 11.8μ; end absorption in ultra-violet absorption spectrum (in ethanol).

EXAMPLE 8

A mixture comprising 2.906 g. of 2,2-dimethyl-3-thiazoline-4-carboxylic acid 2,2,2-trichloroethyl ester, 3.06 g. of acetic anhydride and 152 ml. of triethylamine in 50 ml. of absolute toluene is boiled under reflux for 18 hours with the exclusion of moisture. The solvents are evaporated under a pressure of 12 mm. Hg; the reaction mixture is then evaporated twice with 50 ml. of xylene each time under reduced pressure, the second time at 0.1 mm. Hg, and the dark residue is dissolved in methylene chloride; the solution is diluted with hexane and the methylene chloride is again evaporated. After filtration, a crystalline material forms which is discarded; the hexane solution is evaporated and the residue is chromatographed on 145 g. of silica gel containing 5% of water. After washing with 100 ml. of benzene and 98:2 to 92:8 mixtures of benzene and ethyl acetate, the pure 2,2-dimethyl-3-acetyl-4-thiazoline-4-carboxylic acid 2,2,2-trichloroethyl ester of the formula

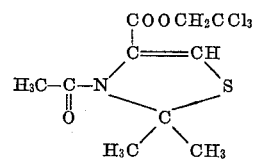

is eluted with 500 ml. of 90:10 to 82:18 mixtures of benzene and ethyl acetate; the product is crystallized from pentane at −18° C. and melts at 54.5 to 55° C. after being recrystallized several times from pentane; infra-red absorption bands (in methylene chloride) at 5.80μ, 6.00μ, 6.43μ, 7.35μ, 7.64μ, 8.40μ, 8.85μ, 9.65μ, 10.42μ, 11.70μ and 12.30μ; ultraviolet absorption spectrum (in ethanol): $\lambda_{max}$ 228 mμ ($\epsilon$=6350), 275 mμ ($\epsilon$=3600) and 328 mμ ($\epsilon$=8200).

The starting material is prepared as follows: 6.95 ml. of triethylamine are added to a mixture of 7.048 g. of the ammonium salt of 2,2-dimethyl-3-thiazoline-4-carboxylic acid in 200 ml. of methanol, the mixture is stirred for 30 minutes and the solution is evaporated under reduced pressure. The residue is treated with 150 ml. of absolute toluene and the mixture is evaporated; the residue is dissolved in 150 ml. of absolute toluene and the mixture is evaporated; the residue is dissolved in 150 ml. of absolute tetrahydrofuran, 7 grams of N,N'-carbonyldiimidazole are added and the mixture is allowed to stand for 17 hours (solution A).

0.162 gram of a 50% sodium hydride suspension in mineral oil is added to 1.4 gram of imidazole in 60 ml. of absolute tetrahydrofuran, followed by 7 ml. of 2,2,2-trichloroethanol. Solution A is added in the course of 20 minutes while stirring and, after 1½ hours, the clear solution is evaporated under reduced pressure; the residue is dissolved in 60 ml. of benzene, evaporated and then dissolved in 100 ml. of ether and 100 ml. of water. After stirring for one hour, the aqueous phase is extracted twice with 100 ml. of benzene each time and once with 100 ml. of a 1:1-mixture of benzene and cyclohexane. The combined organic solutions are dried over magnesium sulfate, evaporated under reduced pressure, and the residue is evaporated to dryness under reduced pressure with 75 ml. of xylene each time. After extraction with a mixture of methylene chloride and hexane, the methylene chloride is distilled out, the hexane solution is isolated and evaporated, the residue is extracted with pentane and recrystallized from pentane. This process yields 2,2-dimethyl-3-thiazoline-4-carboxylic acid 2,2,2 - trichloroethyl ether which, after recrystallization from pentane, melts at 83.5 to 84.5° C.; infra-red absorption bands (in methylene chloride) at 5.67μ, 5.76μ, 6.06μ, 7.34μ, 7.65μ, 8.25μ, 8.36μ, 8.76μ, 9.15μ, 9.50μ, 11.83μ and 12.25μ.

EXAMPLE 9

A solution of 0.435 g. of L-2,2-dimethyl-3-tertiary butyloxycarbonyl-5β-hydroxy-thiazolidine - 4 - carboxylic acid 2,2,2-trichloroethyl ester in 9 ml. of anhydrous dimethylformamide is treated with 0.7 g. of N,N-diisopropyl-N-ethylamine and then 0.35 g. of methanesulfonyl chloride in 2 ml. of dimethylformamide. After stirring for 50 minutes at room temperature, about 0.5 g. of sodium azide is added to the mixture, which contains the L-2,2-dimethyl-3-tertiary butyloxycarbonyl - 5β - methylsulfonyloxy-thiazolidine-4-carboxylic acid 2,2,2-trichloroethylester of the formula

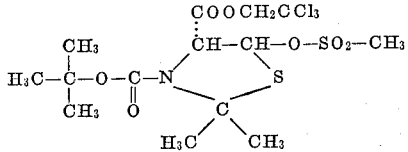

The mixture is stirred for 2½ hours, then poured onto aqueous citric acid of 20% strength and extracted with ether; the organic solution is evaporated and 0.08 g. of the crude product obtained is chromatographed on 20 grams of a diatomaceous earth preparation. Elution with benzene yields the pure L-2,2-dimethyl - 3 - tertiary butyloxycarbonyl-5α-azido-thiazolidine - 4 - carboxylic acid 2,2,2-trichloroethylester of the formula

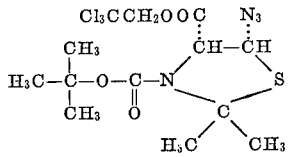

which melts at 80 to 80.5° C. after crystallization from ether; infra-red absorption bands (in methylene chloride) at 4.71μ, 5.65μ, 5.75μ, 5.87μ, 7.25μ, 7.35μ, 8.65μ, 8.83μ, 9.15μ and 9.33μ.

EXAMPLE 10

A solution of 1.1 g. of L-2,2-dimethyl-3-tertiary butyloxycarbonyl-thiazolidine - 4 - carboxylic acid methylester in 15 ml. of bromo-trichloromethane is treated with 2.35 g. of ditertiary butyl-peroxalate and heated under a nitrogen atmosphere for 75 minutes (i.e. until the cessation of the gas development) at a bath temperature of 70°. After evaporating under reduced pressure (first waterpump, then high vacuum), the viscose residue containing the L-2,2-dimethyl - 3 - tertiary butyloxycarbonyl-5β-bromo-thiazolidine-4-carboxylic acid methylester of the formula

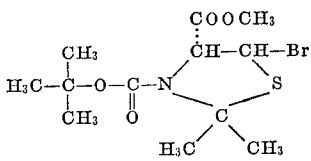

is dissolved in 8 ml. of dimethylformamide and treated, while cooling with water, with a saturated aqueous solution of 0.75 g. of sodium azide and allowed to stand at room temperature for one hour. After adding 30 ml. of water, the organic portion is extracted which two portions of 25 ml. of cyclohexane each, the organic extracts are dried and evaporated, and the viscous residue is chromatographed on 60 g. of purified silica gel and eluted with a 39:1-mixture of benzene and ethylacetate, 40 ml. fractions being taken. Upon evaporating fractions 6–9 one obtains a crude product which according to thin layer chromatography (silica gel; 9:1-mixture of benzene and ethylacetate; characteristic spot with $R_f=0.5$) and NMR and ultraviolet spectra contains the L - 2,2 - dimethyl-3-tertiary butyloxycarbonyl - 5α - azido-thiazolidine-4-carboxylic acid methylester, as well as the 2,2 - dimethyl - 3 - tertiary butyloxycarbonyl - 4 - thiazolin - 4 - carboxylic acid methyl ester, which are identical with the products obtained according to the procedure of Example 1.

EXAMPLE 11

To a solution of 0.418 g. of L-2,2-dimethyl-3-tertiary butyloxycarbonyl - 5β - hydroxy-thiazolidine - 4 - carboxylic-acid diphenylmethyl-ester in 1.6 ml. dry dimethylformamide is added 0.4 ml. of N,N-diisopropyl-N-ethylamine and the mixture is treated dropwise with a solution of 0.17 ml. methane sulfonic acid chloride in 0.2 ml. of dimethylformamide. After stirring for 2 hours at room temperature there is added to the reaction mixture containing the L - 2,2 - dimethyl - 3 - tertiary butyloxycarbonyl-5β-methylsulfonyloxy - thiazolidine - 4 - carboxylic acid diphenylmethylester of the formula

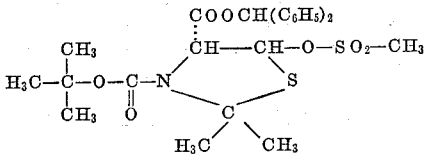

a saturated aqueous solution of 0.5 g. of sodium azide. The mixture is stirred at room temperature of 2½ hours and poured onto 30 ml. of water. The aqueous mixture is extracted twice with 15 ml. each of cyclohexane, the organic extracts are dried and evaporated and the viscous residue is chromatographed on 10 g. of purified silica gel with 160 ml. of a 39:1- and 160 ml. of a 9:1-mixture of benzene and ethyl acetate, fractions of 10 ml. being taken. Fractions 6–10 contain the L - 2,2 - dimethyl - 3 - tertiary butyloxycarbonyl - 5β - azido-thiazolidine - 4 - carboxylic acid diphenylmethylester of the formula

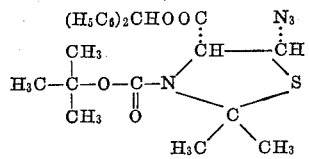

which in the infrared absorption spectrum (in methylene chloride) shows bands at 4.76μ, 5.70μ, 5.85μ and 5.92μ, whereas fractions 18–30 furnish unchanged L - 2,2 - dimethyl - 3 - tertiary butyloxycarbonyl - 5β - hydroxythiazolidine - 4 - carboxylic acid diphenylmethylester.

EXAMPLE 12

To a solution of 0.16 g. L - 2,2 - dimethyl - 3 - tertiary butyloxycarbonyl - 5α - azido - thiazolidine - 4 - carboxylic acid diphenylmethylester in 2 ml. of benzene are added 0.15 ml. of anisole and 0.15 ml. of trifluoroacetic acid; the mixture is allowed to stand for 2 hours at room temperature and evaporated under reduced pressure. The residue is dissolved in 10 ml. of benzene and the solution is washed twice with 10 ml. each of a saturated sodium hydrogen carbonate solution. After acidifying the aqueous extract with citric acid it is extracted with methylene chloride, the organic extract is dried and evaporated, and the viscous residue is crystallized twice from hexane to yield the pure L - 2,2 - dimethyl - 3 - tertiary butyloxycarbonyl-5α-azido-thiazolidine - 4 - carboxylic acid of the formula

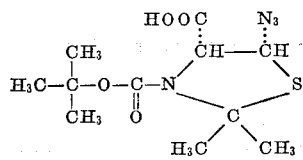

melting point 116–117°; infrared absorption bands (in methylene chloride) at 3.25μ, 4.75μ, 5.82μ and 5.87μ.

EXAMPLE 13

A solution of 81.17 g. of benzyltriethyl ammonium azide in 500 ml. of acetonitrile is added to 83.65 g. of crude L-2,2 - dimethyl-3-tertiary butyloxycarbonyl-5β-chloro-thiazolidine-4-carboxylic acid methyl ester and the mixture is shaken until a clear brown solution is formed, then allowed to stand during 14½ hours at room temperature and concentrated under reduced pressure. The resulting crystalline mass is taken up into 1000 ml. of water and 1000 ml. of pentane; the organic phase is washed with 1000 ml. of water and the combined aqueous solutions are back-washed with 500 ml., then with 250 ml.

of pentane. The first two extracts (1500 ml.) are combined, dried over sodium sulfate and evaporated under reduced pressure. The oily residue is dissolved in 400 ml. of pentane, the solution is treated with 10 g. of a charcoal preparation, filtered through a filter aid (Celite) and the filtrate together with about 1000 ml. of washing solution is evaporated to dryness. The oily residue crystallizes from 22 g. of pentane while standing at −15° C. for 16 hours. The product is filtered off, washed with cold (−15° C.) pentane and dried, and again recrystallized from 34 g., 17 g. and 20 g. of pentane according to the above procedure. The resulting product is again recrystallized from 20 g. of pentane, together with material isolated from the mother liquors; this time the temperature is very slowly brought to room temperature, and after the crystallization ceases, the mixture is allowed to stand for 3 hours at 7° C., for 3 hours at 0° C. for 2 days at −15° C. and for 2 hours at −18° to −22° C. The liquid is siphoned off and the solid material is dried under reduced pressure; one thus obtains the L-2,2-dimethyl-3-tertiary butyloxycarbonyl-5α-azido-thiazolidine-4-carboxylic acid methyl ester, melting point 55–56° C. A further amount of the product is obtained by concentrating the mother liquors to a volume of 2 ml., cooling to −5° C. and recrystallizing as above. The starting material is prepared as follows: A solution of 0.582 g. L-2,2-dimethyl-3-tertiary butyloxycarbonyl-5β-hydroxy-thiazolidine-4-carboxylic acid methyl ester in 2 ml. dioxane is treated with 0.405 g. of triethylamine and then with 3 ml. of a 1-molar solution of thionyl chloride in dioxane; the temperature rises to 40–45° C. After 2½ minutes, the suspension is concentrated under reduced pressure and at room temperature, and the residue is extracted several times with a total of 30 ml. of ether. The solvent is evaporated and the residue is allowed to stand at 60° C. under a water-jet-vacuum. The resulting L-2,2-dimethyl-3-tertiary butyloxycarbonyl-5β-chloro-thiazolidine-4-carboxylic acid methyl ester is used without further purification; it contains only traces of the corresponding 5α-chloro-derivative.

The starting material is also prepared as follows: A mixture of 5.82 g. of L-2,2-dimethyl-3-tertiary butyloxycarbonyl-5β-hydroxy - thiazolidine - 4 - carboxylic acid methyl ester in 20 ml. of dioxane is treated with 5.6 ml. of triethylamine and, after cooling to 10° C., with 30 ml. of a 1-molar solution of thionyl chloride in dioxane while stirring. After 3 minutes (a precipitate is being formed and sulfur dioxide evolves), 250 ml. of toluene are added, the mixture is stirred during 1 minute, filtered and washed with 50 ml. of toluene. The combined organic solutions are cooled to 10° C., filtered and evaporated under reduced pressure at 25–30° C. The brownish oily residue is taken up into 150 ml. of pentane, insoluble material is filtered off and the filtrate is evaporated under reduced pressure. The oily residue is distilled and the slightly yellowish L-2,2 - dimethyl-3-tertiary butyloxycarbonyl-5β-chlorothiazolidine-4-carboxylic acid methyl ester is obtained at 80–85° C./0.001 mm. Hg; it does not contain any of the 5α-chloro derivative and crystallizes, M.P. 35–37° C.; $[\alpha]_D^{20} = +164° \pm 1°$ (c.=1.05 in chloroform); infrared absorption spectrum (in methylene chloride) with bands at 5.68μ, 5.88μ, 7.38μ, 7.52μ, 8.35μ, 8.62μ, 9.22μ, 9.35μ, 10.10μ and 11.65μ.

EXAMPLE 14

A solution of 1.006 g. of L-2,2-dimethyl-3-tertiary butyloxycarbonyl-5β-chloro-thiazolidine-4-carboxylic acid methyl ester in 5 ml. of methylene chloride is treated with a solution of 1.85 g. of benzyl triethylammonium azide in 5 ml. of methylene chloride. The mixture is allowed to stand at room temperature during 2 hours and 10 minutes, is then evaporated under reduced pressure to yield a yellow residue and diluted with 30 ml. of pentane. After vigorously stirring for a few minutes, the precipitate is filtered off and washed several times with a total of about 50 ml. of pentane. The filtrate and the washings are evaporated at 50° C. under reduced pressure, and the yellowish oily residue is crystallized from 1 g. of pentane as described in Example 13 to yield the resulting L-2,2-dimethyl-3-tertiary butyloxycarbonyl-5α-azido - thiazolidine-4-carboxylic acid methyl ester; a further amount of the latter is obtained from the mother liquors.

The benzyl triethyl ammonium azide reagent is obtained as follows: A suspension of 893 g. of an adsorbing resin in chloride form (Amberlite IRA 410) in 400 ml. of water is filled into a chromatography column of 8 cm. width. After taking 1000 ml. of water, the column is washed with a solution of 140 g. of sodium azide in 1000 ml. of water, the solution being passed through in the course of one hour. The excess of sodium azide is washed out with 1750 ml. of water, and in the course of one hour a solution of 242 g. of benzyl triethyl ammonium chloride in 1000 ml. of water is passed, the eluate being collected with the start of the addition. After washing out with 1500 ml. of water, the eluate and the washing is evaporated at 12 mm. Hg pressure in a rotary evaporator. The resulting colorless syrup is taken up into 250 ml. of a 1:1-mixture of methylene chloride and acetonitrile and the solution is again evaporated under reduced pressure. The glass-like residue is dried at 50° C./0.1 mm. Hg; the very hygroscopic benzyl triethyl ammonium azide crystallizes and melts at about 100–110° C.

EXAMPLE 15

A solution of 0.997 g. of L-2,2-dimethyl-3-tertiary butyloxycarbonyl - 5α - chloro-thiazolidine-4-carboxylic acid methyl ester in 5 ml. of methylene chloride is cooled to −18° C. and treated with a solution of 1.51 g. of benzyl triethyl ammonium azide in 10 ml. of methylene chloride; the mixture is allowed to stand at −20° during 6½ hours and is then worked up as described in Example 14. The almost colorless oil crystallizes from 0.95 g. of pentane by standing at −15° for 20 hours; it is filtered off and washed with pentane at −15°. Mother liquors and washings are passed through a column with 0.3 g. of a charcoal preparation and the residue of the eluate is crystallized from a small amount of pentane. The resulting L-2,2-dimethyl-3-tertiary butyloxycarbonyl-5α-azido-thiazolidine-4-carboxylic acid methyl ester is obtained in good yields and purity.

EXAMPLE 16

A solution of 9.1 g. of tertiary butanol in 10 ml. of tetrahydrofuran is added dropwise at 0° C. in a nitrogen atmosphere to a mixture of 1.4 g. of lithium aluminum hydride in 35 ml. of anhydrous tetrahydrofuran while stirring. The mixture is stirred for one hour at 0° C. and then a solution of 3.45 grams of L-2,2-dimethyl-3-tertiary butyloxycarbonyl-5α-azido-thiazolidine-4-carboxylic acid methyl ester in 5 ml. of tetrahydrofuran is added; the reaction mixture is kept at room temperature for 1½ hours, whereupon it is poured into 200 ml. of ice-water and extracted with methylene chloride. The organic phase is evaporated and the oil obtained is dissolved in 80 ml. of pentane. The solution is filtered through 1 g. of a charcoal preparation, the latter is washed with 50 ml. of pentane and the combined filtrates are evaporated. The viscous residue is dissolved in 40 ml. of pentane; the solution is allowed to stand for 3 hours at −15° C. and the L-2,2-dimethyl-3-tertiary butyloxycarbonyl-5α-amino-thiazolidine-4-carboxylic acid methyl ester of the formula

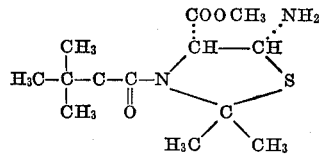

crystallizes in the form of colorless needles; it is dried for 3 hours at 20° C./0.05 mm. Hg. Melting point: 64–65.5° C.; $[\alpha]_D = -113° \pm 1°$ (c.=0.801 in chloroform);

infra-red absorption bands (in methylene chloride) at 2.93μ, 3.00μ, 5.75μ, 5.90μ, 6.20μ, 7.25μ, 7.45μ, 8.35μ, 8.60μ and 9.35μ.

EXAMPLE 17

Hydrogen is passed through a solution of 0.337 gram of L-2,2-dimethyl-3-tertiary butyloxycarbonyl-5α-azido-thiazolidine-4-carboxylic acid methyl ester in 3 ml. of ethanol for 4 hours, a total of 0.6 gram of a palladium catalyst (10% of palladium-on-calcium carbonate) being added in 3 portions in the course of the first 3 hours. The reaction mixture is filtered through a filter aid (Hyflo) and the brown filtrate is evaporated. The viscous residue is extracted with citric acid and the crude product obtained is L-2,2-dimethyl-3-tertiary-butyloxycarbonyl-5α-amino-thiazolidine-4-carboxylic acid methyl ester; this is combined with the product obtained in the manner described in Example 18 and the combined products are further processed in the manner described in Example 18.

EXAMPLE 18

To a water-cooled solution of 0.321 g. of L-2,2-dimethyl-3-tertiary butyloxycarbonyl - 5α - azido-thiazolidine-4-carboxylic acid methyl ester in 8 ml. of acetic acid of 90% strength are added in the course of 5 minutes 2 g. of zinc powder. After a further 10 minutes the mixture is poured onto 100 ml. of a saturated aqueous solution of sodium hydrogen carbonate; solid sodium hydrogen carbonate is added until the pH is 8 to 9 and then extraction is effected with methylene chloride. The organic extract is dried and evaporated and the viscous residue is divided into a neutral portion and a basic portion by extraction with citric acid. The neutral phase of the organic solvent yields the L-2,2-dimethyl-3-tertiary butyloxycarbonyl-5β-acetyloxy-thiazolidine-4-carboxylic acid methyl ester. The product of the acidic aqueous extract, i.e. the basic residue is combined with the product obtained in the manner described in Example 17 and the combined products are chromatographed on 10 g. silica gel. A 3:1 mixture of benzene and ethyl acetate yields the pure L-2,2-dimethyl-3-tertiary butyloxycarbonyl - 5α-amino-thiazolidine-4-carboxylic acid methyl ester which melts at 62 to 65° C. after recrystallization from pentane.

EXAMPLE 19

After a short treatment with a 10% aqueous sodium hydroxide solution, 2 g. of finely granulated aluminum are washed with water and then treated with a 0.5% aqueous mercury-(II)chloride solution. A solution of 0.746 g. of L-2,2-dimethyl-3-tertiary butyloxycarbonyl-5α-azido-thiazolidine-4-carboxylic acid methyl ester in 10 ml. of ether is added to the amalgam which has been washed with water; after 10 minutes the ether solution is decanted, dried and evaporated. The viscous residue is chromatographed on 25 g. of silica gel and the desired L-2,2-dimethyl - 3 - tertiary-butyloxycarbonyl-5α-amino-thiazolidine-4-carboxylic acid methyl ester is eluted with a 3:1 mixture of benzene and ethyl acetate; the product melts at 64 to 66° C. after crystallization from pentane.

EXAMPLE 20

A solution of 3.16 g. of L-2,2-dimethyl-3-tertiary butyloxycarbonyl-5α-azido-thiazolidine-4-carboxylic acid methyl ester in 50 ml. of anhydrous benzene is treated dropwise with 2.2 g. of tri-n-butyl-phosphine while maintaining a nitrogen atmosphere. The mixture is allowed to stand for 5 hours at room temperature; the yellow solution, which contains the L-2,2-dimethyl-3-tertiary butyloxycarbonyl-5α-tri-n-butylphosphinimino - thiazolidine-4-carboxylic acid methyl ester, is then poured into 50 ml. of water and the mixture is stirred for 15 hours. After evaporation the residue of the benzene solution is triturated with pentane, the pentane solution is washed three times with 100 ml. of water each time and evaporated. The viscous residue is chromatographed on 200 grams of silica gel and the desired L-2,2-dimethyl-3-tertiary butyl- oxycarbonyl-5α-amino - thiazolidine - 4 - carboxylic acid methyl ester is eluted with a 3:1 mixture of benzene and ethyl acetate; it is identical with the product obtained in Examples 16, 18 and 19.

L-2,2 - dimethyl - 3 - tertiary butyloxycarbonyl-5α-triphenyl-phosphinimino - thiazolidine - 4 - carboxylic acid methyl ester, which can be used in the same way, is obtained in the following manner:

A solution of 0.316 g. of L-2,2-dimethyl-3-tertiary butyloxycarbonyl - 5α - azido - thiazolidine - 4 - carboxylic acid methyl ester in 15 ml. of pure methylene chloride is treated with 0.2623 g. of recrystallized triphenylphosphine and the mixture is boiled under reflux for 3½ hours. Cautious evaporation produces a white, foam-like material which crystallizes from hexane containing a small amount of methylene chloride; the L-2,2-dimethyl-3-tertiary butyloxycarbonyl - 5α - triphenyl-phosphinimino-thiazolidine-4-carboxylic acid methyl ester of the formula

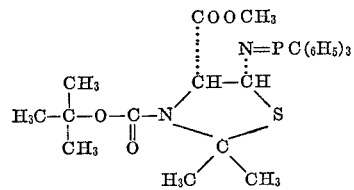

so obtained melts at 173 to 175° C. after drying in a high vacuum; [α]$_D$= −67°±1° (c.=1.247 in chloroform); infra-red absorption bands (in methylene chloride) at 5.79μ, 5.91μ, 6.14μ, 6.8μ, 7.02μ, 7.29μ, 7.38μ, 7.44μ, 8.36μ 8.60μ, 9.07μ, 9.35μ, 9.78μ, 10.09μ, 10.66μ and 11.65μ; ultra-violet absorption bands (in ethanol) $\lambda_{max}$ 220 mμ (ε=25,000) and 268 mμ (ε=2420).

It can also be obtained in the following manner:
A solution of 0.427 g. of triphenylphosphine in 5 ml. of hexane is added to a solution of 0.485 g. of pure L-2,2-dimethyl - 3 - tertiary butyloxycarbonyl-5α-azido-thiazolidine-4-carboxylic acid methyl ester in 5 ml. of hexane and the mixture is heated to 70° C. Crystallization starts after about 2 minutes, the vessel is closed and the mixture is allowed to cool. After 2 hours at 0° C. the supernatent solution is decanted and the crystalline material is washed with 5 ml. of pentane and dried; the product so obtained melts at 180 to 181° C. and is identical with the product obtained by the process described above.

EXAMPLE 21

A mixture of 58.2 g. of L-2,2-dimethyl-3-tertiary butyloxycarbonyl-5α - azido - thiazolidine - 4 - carboxylic acid methyl ester in 750 ml. of methanol, 750 ml. of cyclohexane and 350 ml. of hexane is cooled to −18° C. while stirring, and treated in a vessel having a vibration stirrer with aluminum amalgam (prepared by treating 10 g. of aluminum shavings with a 2 N sodium hydroxide solution and then with mercury-(II) chloride, followed by washing with water and then with anhydrous methanol). The mixture is then washed with a small amount of methanol. After 40 hours at −15 to −18° C., unreacted starting material is still detectable; 5 grams of freshly prepared aluminum amalgam are added and stirring is continued for a further 8 hours at −18° C. After filtration and washing with methanol, the inorganic residue is boiled for a short time with methanol and the solution is combined with the filtrate. The combined organic solutions are evaporated and the oily residue is extracted with pentane. The pentane solution is evaporated to a volume of 250 to 300 ml., allowed to stand at −18° C. and is then decanted from the semi-crystalline product. The latter is washed with a small amount of pentane and recrystallized from pentane; the L-2,2-dimethyl-3-tertiary butyloxycarbonyl-5α-amino-thiazolidine-4 - carboxylic acid methyl ester is dissolved in pentane, filtered through anhydrous magnesium sulfate, concentrated to a volume of 150 to 200 ml. and crystallized; after further recrystallization from pentane the ester obtained melts at 64 to 65° C.

EXAMPLE 22

A solution of 0.141 g. of L - 2,2-dimethyl-3-tertiary butyloxycarbonyl-5α-azido-thiazolidine-4-carboxylic acid methyl ester in 15 ml. of methanol is cooled to −15° C. and then 0.3 g. of chromium-(II)-acetate is added; a further amount of 0.24 g. of the reducing agent is added after 35 minutes. After stirring for 4 hours at −10 to −18° C., the reaction mixture is filtered, the residue is washed with methanol and 50 ml. of cyclohexane and the filtrate is evaporated under reduced pressure. The residue is extracted with cyclohexane and a mixture comprising the L-2,2-dimethyl - 3 - tertiary butyloxycarbonyl-5α-amino-thiazolidine-4-carboxylic acid methyl ester and the corresponding 5β-amino compound is obtained which can be separated by means of a thin-layer chromatogram.

EXAMPLE 23

A solution of 0.32 g. of L-2,2-dimethyl-3-tertiary butyloxycarbonyl - 5α - azido-thiazolidine-4-carboxylic acid methyl ester in a mixture of 0.47 g. of di-n-butyl-tin-dihydride and 1 ml. of hexane is allowed to stand for 18 hours at room temperature in a nitrogen atmosphere. A total of 30 ml. of pentane is added, the mixture is extracted three times with 20 ml. of a 20% aqueous citric acid solution each time, the aqueous solutions are saturated with solid sodium hydrogen carbonate and extracted with methylene chloride. The residue from the organic extracts is dissolved in pentane, filtered through 2.5 grams of a charcoal preparation (Carboraffin) and washed with 40 ml. of methylene chloride. After evaporation, the residue is crystallized from pentane at −20° C.; the pure L-2,2-dimethyl-3-tertiary butyloxycarbonyl-5α-amino-thiazolidine-4-carboxylic acid methyl ester so obtained melts at 64.5 to 65.5° C.

EXAMPLE 24

A mixture of 0.3164 g. of L-2,2-dimethyl-3-tertiary butyloxycarbonyl-5α-azido-thiazolidine-4-carboxylic acid methyl ester in 10 ml. of methanol and 1 ml. of acetic acid is treated with 5 g. of sodium amalgam (5%), the mixture is stirred for 2 minutes, filtered and evaporated. The residue, which still contains starting material, is dissolved in 10 ml. of dioxane and 0.6 ml. of acetic acid; 5 g. of sodium amalgam are added and the mixture is stirred for 15 minutes. After working up in the manner described above the residue is dissolved in 20 ml. of methylene chloride and extracted 5 times with a 20% aqueous solution of citric acid each time. The acidic solution is worked up in the manner described in the foregoing examples and a crude product is obtained which consists mainly of L - 2,2 - dimethyl-3-tertiary-butyloxycarbonyl - 5α - amino-thiazolidine-4-carboxylic acid methyl ester.

EXAMPLE 25

A solution of 0.973 g. of L-2,2-dimethyl-3-tertiary butyloxycarbonyl-5α-azido-thiazolidine-4-carboxylic acid methyl ester in 25 ml. of methanol and 2.40 ml. of acetic acid is cooled to −8° C.; 0.5 g. of magnesium shavings is added and the reaction is started by the addition of a few crystals of mercury-(II)-chloride. After stirring for 90 minutes at −5° C. to −8° C., 0.25 g. of magnesium followed by 1.2 ml. of acetic acid and a trace of mercury-(II)-chloride are added. After stirring for a further 2 hours the reaction mixture is filtered and washed with methanol; the organic solutions are combined and then evaporated to dryness under reduced pressure. The residue is dissolved in 130 ml. of water (pH about 8), extracted three times with 50 ml. of methylene chloride each time and the dried extracts are evaporated. The oil obtained crystallizes from pentane (−10° C.) and the L-2,2-dimethyl-3-tertiary butyloxycarbonyl-5α-amino-thiazolidine-4-carboxylic acid methyl ester melts at 63 to 65° C. after recrystallization from the same solvent.

EXAMPLE 26

A solution of 9.96 g. of L-2,2-dimethyl-3-tertiary butyloxycarbonyl - 5α - azido-thiazolidine-4-carboxylic acid methyl ester in 300 ml. of methanol is cooled to −9° C.; 9 g. of aluminum amalgam are added and the mixture is stirred for 6 hours at −10 to 0° C. After filtration and washing with methanol, the combined organic solutions are evaporated under reduced pressure; the colorless syrupy residue is extracted with 200 ml. of warm pentane and the organic extracts are evaporated. The residue insoluble in pentane is triturated with 250 ml. of methanol and the separated methanol solution is evaporated under reduced pressure. The pentane-soluble and methanol-soluble fractions are combined and crystallized from about 30 ml. of pentane; after recrystallization from pentane the L-2,2-dimethyl-3-tertiary butyloxycarbonyl-5α-amino-thiazolidine-4-carboxylic acid methyl ester melts at 64 to 66° C.

By prolonging the reaction time to 11 hours at −10° C. to −15° C. the yield of L-2,2-dimethyl-3-tertiary butyloxycarbonyl - 5α - amino-thiazolidine-4-carboxylic acid methyl ester is increased;. a further amount of the desired material is obtained from the mother liquor of crystallization.

EXAMPLE 27

A mixture of 0.136 g. of L-2,2-dimethyl-3-tertiary butyloxycarbonyl - 5α - azido-thiazolidine-4-carboxylic acid methyl ester in 3 ml. of methanol and 2.5 ml. of acetic acid is treated at room temperature and while stirring with 0.05 g. of aluminum amalgam. The mixture is stirred for one hour, filtered, washed, evaporated, and the residue is extracted with pentane; the product obtained after evaporation still contains unreacted starting material, and 0.215 g. of the crude product is stirred for a further 230 minutes in 3 ml. of methanol and 2½ ml. of acetic acid with 0.07 g. of aluminum amalgam. After the usual working up procedure, L-2,2-dimethyl-3-tertiary butyloxycarbonyl-5α-amino-thiazolidine-4-carboxylic acid methyl ester is obtained, M.P. 61 to 65° C. after recrystallization from pentane.

EXAMPLE 28

While stirring, 2 g. of zinc dust are added in portions and in the course of 5 minutes to a solution of 0.26 g. of L - 2,2 - dimethyl - 3 - tertiary butyloxycarbonyl-5α-azido-thiazolidine - 4 - carboxylic acid 2,2,2-trichloroethyl ester in 8 ml. of aqueous acetic acid of 90% strength. After stirring for 2½ hours at room temperature, the reaction is filtered, the residue is washed with 2 ml. of glacial acetic acid and 5 ml. of methylene chloride and the filtrate is evaporated. The residue is stirred several times with methylene chloride, the organic solution is washed with 10 ml. of water, dried, and evaporated. The residue contains a mixture of L-2,2-dimethyl-3-tertiary butyloxycarbonyl - 5α - amino-thiazolidine - 4 - carboxylic acid of the formula

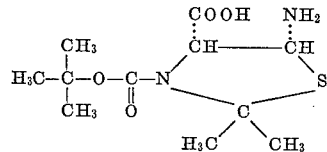

and 2,2-dimethyl-3-tertiary butyloxycarbonyl - 4 - thiazoline-4-carboxylic acid of the formula

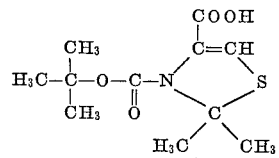

The solution of the crude product in methylene chloride is extracted 3 times with 20 ml. of 20% aqueous citric acid each time. The acidic extracts are adjusted to a pH value of about 5 with sodium carbonate and the aqueous solution is extracted three times with 20 ml. of methylene chloride. Drying and evaporation yields the amorphous L-2,2-dimethyl-3-tertiary butyloxycarbonyl - 5α - amino-thiazolidine - 4 - carboxylic acid which, in the infrared absorption spectrum, shows bands (in methylene chloride) at 2.84μ, 2.93μ, 5.76μ, 5.90μ, 7.37μ and 8.63μ.

EXAMPLE 29

A solution of 0.121 g. of L-2,2-dimethyl-3-tertiary-butyloxycarbonyl - 5α - azido-thiazolidine-4-carboxylic acid 2,2,2-trichloroethyl ester in 10 ml. of methanol is cooled to −20° C. and treated with 0.5 g. of aluminum amalgam. The reaction mixture is stirred for 55 hours at −20° C., for 22 hours at 0° C. and for 18 hours at +25° C. The insoluble material is filtered off and the filtrate is evaporated to yield an oily residue which according to thin layer chromatography contains starting material and an about equal amount of the more polar L - 2,2 - dimethyl - 3 - tertiary-butyloxycarbonyl-5α-amino-thiazolidine - 4 - carboxylic acid 2,2,2-trichloroethylester of the formula

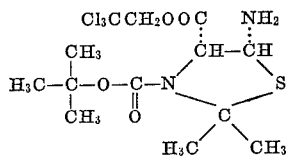

the infrared absorption spectrum of the latter (in methylene chloride) shows characteristic bands at 2.84μ and 2.92μ.

The filter residue is dissolved in aqueous tartaric acid and extracted with methylene chloride to yield a mixture of tartaric acid and of the L-2,2-dimethyl - 3 - tertiary-butyloxycarbonyl - 5α - amino-thiazolidine-4-carboxylic acid, which is identical with the product obtained according to the method described in Example 28.

The starting material is prepared as described in Example 9; instead of the L-2,2-dimethyl-3-tertiary-butyloxycarbonyl - 5β - methylsulfonyloxy-thiazolidine-4-carboxylic acid 2,2,2-trichloroethyl ester one may also use as an intermediate the L-2,2-dimethyl-3-tertiary-butyloxycarbonyl - 5β - chloro-thiazolidine-4-carboxylic acid 2,2,2-trichloroethyl ester, which may be prepared as follows: a solution of 0.409 g. L-2,2-dimethyl-3-tertiary-butyloxycarbonyl - 5β - hydroxy-thiazolidine-4-carboxylic acid 2,2,2-trichloroethyl ester in 5 ml. dioxane is treated with 0.3 ml. triethylamine; the clear solution is cooled to 10° C. and 1.5 ml. of a 1-molar solution of thionyl chloride in dioxane is added. Shortly after completion of the addition a precipitate is formed and the color changes to yellow. The suspension is concentrated at room temperature under reduced pressure to a volume of about 2 ml. and 25 ml. of toluene are added. After 2 minutes the suspension is filtered, the removed salt is washed with toluene and the filtrate is evaporated under reduced pressure and at room temperature to yield a yellow oily product, which is extracted with n-hexane. After evaporating the solvent under reduced pressure and at room temperature, the resulting clear yellow oil is dissolved in n-hexane and treated with a charcoal preparation (Carboraffin) and the desired L-2,2-dimethyl-3-tertiary-butyloxycarbonyl - 5β - chloro-thiazolidine-4-carboxylic acid 2,2,2-trichloroethyl ester of the formula

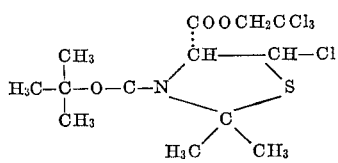

is obtained as a colorless oil, [α]$_D$=+95°±1° (c.=1.005 in chloroform); infrared absorption spectrum (in methylene chloride) with bands at 5.65μ, 5.72μ, 5.9μ, 8.65μ, 9.2μ, 9.35μ and 9.85μ.

EXAMPLE 30

0.74 g. of arsenic bisulfide (realgar, As$_2$S$_2$) is added to a solution of 1.2 g. of sodium sulfide in 3 ml of water, and the resulting solution is treated at 0° C. with a solution of 0.158 g. of L-2,2-dimethyl-3-tertiary butyloxycarbonyl-5α-azido-thiazolidine - 4 - carboxylic acid methyl ester in 3 ml. of ethanol. The reaction mixture is stirred at 0° C. for 15 minutes until gas ceases to evolve and then extracted with methylene chloride. The residue obtained after evaporating the organic extract shows in the thin-layer chromatogram (system: 3:1 mixture of benzene and ethyl actate) the presence of starting material; infrared bands (in methylene chloride) at 4.70μ; and of L-2,2-dimethyl - 3 - tertiary butyloxycarbonyl-5α-amino-thiazolidine-4-carboxylic acid methyl ester; characteristic infrared bands (in methylene chloride) at 2.90μ, 2.97μ, 10.05μ and 10.25μ; contaminated by the corresponding 5β-amino ester.

EXAMPLE 31

A mixture of 0.222 g. of stannous chloride dihydrate (SnCl$_2$·2H$_2$O) in 4 ml. of a 1 N sodium hydroxide solution is stirred for 5 minutes at 0° C., the resulting suspension is filtered and the insoluble portion washed with 1 ml. of water. The filtrate is cooled to 0° C. and added in one portion to a solution, cooled to 0° C., of L-2,2-dimethyl-3-tertiary-butyloxycarbonyl - 5α - azido-thiazolidine-4-carboxylic acid methyl ester in 5 ml. of absolute ethanol; the reaction vessel is cooled in an ice-bath and the reaction mixture stirred for 5 minutes until gas ceases to evolve. After the addition of 5 ml. of water the batch is extracted once with 10 ml. and once with 3 ml. of methylene chloride and the extracts dried over sodium sulfate are evaporated. The colorless oily residue is crystallized from 1 ml. of pentane (0° C., 16 hours) and recrystallized from the same solvent; the resulting L-2,2-dimethyl-3-tertiary-butyloxycarbonyl-5α - amino-thiazolidine-4-carboxylic acid methyl ester melts at 61–65° C.

EXAMPLE 32

A mixture of 0.63 g. of stannous chloride dihydrate is stirred for 5 minutes at 0° C. with 6.8 ml. of 1 N sodium hydroxide solution and the mixture added in one portion to an ice-cooled solution of 0.332 g. of L-2,2-dimethyl-3-tertiary-butyloxycarbonyl - 5α - azido-thiazolidine-4-carboxylic acid methyl ester in 5 ml. of tetrahydrofuran. The reaction mixture is stirred at 0° C. for 5 minutes and 10 ml. of water and 30 ml. of methylene chloride are then added. The organic phase is evaporated under reduced pressure; the resulting oily residue still contains a large amount of starting material and is treated as follows: 0.324 g. of the resulting product in 6 ml. of tetrahydrofuran is cooled to 0° C. and treated with a sodium stannite suspension (prepared from 0.61 g. of stannous chloride dihydrate and 6.7 ml. of 1 N sodium hydroxide solution (5 minutes, 0° C.)) and stirred with a magnetic stirrer for one hour at 0° C. The reaction mixture is worked up as described above; the colorless oily product crystallizes on standing and is recrystallized from 1.6 g. of pentane at −15° C.; the resulting L-2,2-dimethyl-3-tertiary-butyloxycarbonyl - 5α - amino-thiazolidine-4-carboxylic acid methyl ester, after further crystallization from 1 g. of pentane, melts at 64–65.5° C.

EXAMPLE 33

A solution of 0.166 g. L-2,2-dimethyl-3-tertiary-butyloxycarbonyl-5α-azido-thiazolidine-4-carboxylic acid 2,2,2-trichloroethyl ester in 10 ml. of dry ethanol is cooled to 0° C. A slurry of sodium stannite, prepared by treating at 0° C. 0.3 g. of stannous chloride dihydrate with 4 ml. of a 1 N sodium hydroxide solution in water for five minutes, is added in one portion to the solution and the mixture is stirred at 0° for 2½ minutes. The reaction is stopped by adding 1 ml. of a 20% aqueous citric acid solution, and the reaction mixture is diluted with 10 ml. of water and extracted once with 20 ml. and once with 10 ml. of methylene chloride. The dried organic extracts are evaporated under reduced pressure, the resulting oil is dissolved in pentane, the solution is filtered, concentrated to a volume of about 1 ml. and cooled to −15° for 16 hours. The crystalline L-2,2-dimethyl-3-tertiary-butyl-oxycarbonyl-5α-amino-thiazolidine-4-carboxylic acid 2,2,2-trichloroethyl ester melts at 49–62° C.; infrared absorption bands (in methylene chloride) at 2.85–2.9μ, 5.70μ, 5.85–5.92μ (broad), 6.25μ, 7.40μ, 8.65μ and 9.40μ.

I claim:
1. A compound of the formula

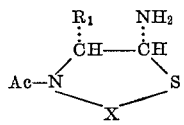

in which Ac represents a member selected from the group consisting an acyl residue of a semi-ester of carbonic acid, X stands for the group of the formula

in which $R_2$ and $R_3$ each stands for lower alkyl, and $R_1$ is a member selected from the group consisting of a free carboxyl group, a carboxyl group esterified with a member selected from the group consisting of lower alkanols and halogenated lower alkanols, the carbamyl group, the nitrile group, the azido-carbonyl group, the hydrazinocarbonyl group and the azo-carbonyl group.

2. A compound as claimed in claim 1 and being a compound of the formula

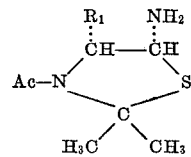

in which Ac stands for the acyl residue of a semiester of carbonic acid and $R_1$ is a carboxyl group esterified with a member selected from the group consisting of a lower alkanol and a halogenated lower alkanol.

3. A compound as claimed in claim 1 and being L-2,2-dimethyl-3-tertiary butyloxycarbonyl - 5α - amino-thiazolidine-4-carboxylic acid methyl ester.

4. A compound as claimed in claim 1 and being L-2,2-dimethyl-3-tertiary butyloxycarbonyl - 5α - amino-thiazolidine-4-carboxylic acid.

5. A compound as claimed in claim 1 and being L-2,2-dimethyl-3-tertiary butyloxycarbonyl - 5α - amino-thiazolidine-4-carboxylic acid-2,2,2-trichloroethyl ester.

References Cited

Smith: Open-Chain Nitrogen Compounds, vol. II, Benjamin, N.Y., 1966, p. 251.

ALEX MAZEL, Primary Examiner

R. J. GALLAGHER, Assistant Examiner